(12) United States Patent
Soneda et al.

(10) Patent No.: US 6,619,111 B2
(45) Date of Patent: Sep. 16, 2003

(54) METHOD AND DEVICE FOR MONITORING PERFORMANCE OF INTERNAL PUMP

(75) Inventors: Hideo Soneda, Hitachi (JP); Kenichi Yasuda, Hitachi (JP); Kumiaki Moriya, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/942,966

(22) Filed: Aug. 31, 2001

(65) Prior Publication Data

US 2002/0170349 A1 Nov. 21, 2002

(51) Int. Cl.⁷ .............................................. G01M 19/00
(52) U.S. Cl. ........................................... 73/168; 702/34
(58) Field of Search ................... 73/168, 1.16; 417/18, 417/19, 20, 21, 22, 23, 63; 702/34

(56) References Cited

U.S. PATENT DOCUMENTS

| | | | |
|---|---|---|---|
| 4,108,574 A | * 8/1978 | Bartley et al. | 417/19 |
| 4,475,168 A | * 10/1984 | Brown | 364/803 |
| 4,558,593 A | * 12/1985 | Watanabe et al. | 73/168 |
| 4,584,876 A | * 4/1986 | Aprill, Jr. | 73/168 |
| 4,821,580 A | * 4/1989 | Jorritsma | 73/861 |
| 4,905,511 A | * 3/1990 | Reinhold | 73/168 |
| 5,050,092 A | * 9/1991 | Perry | 364/506 |
| 5,210,704 A | * 5/1993 | Husseiny | 364/551.01 |
| 5,365,459 A | * 11/1994 | Perry | 364/509 |
| 5,694,808 A | * 12/1997 | Weis | 73/168 |
| 6,087,945 A | * 7/2000 | Yasuda | 340/611 |
| 6,260,004 B1 | * 7/2001 | Hays et al. | 702/183 |

FOREIGN PATENT DOCUMENTS

| | | | | |
|---|---|---|---|---|
| DE | 3824847 A1 | * 1/1990 | | G01L/3/10 |
| JP | 06-160582 | 6/1994 | | |
| JP | 08-330147 | 12/1996 | | |
| JP | 11-190791 | 7/1999 | | |

* cited by examiner

Primary Examiner—Hezron Williams
Assistant Examiner—C D Garber
(74) Attorney, Agent, or Firm—Crowell & Moring LLP

(57) ABSTRACT

A method for monitoring the performance of internal pumps in a plant in which a coolant is driven through plural internal pumps, said method comprising measuring the pump motor power input to the motor driving said pump; estimating the power input to said pump motor during a test performed outside said plant corresponding to the pump speed and the pump flow measured within said plant; computing a pump motor input power ratio based on said measured value and said estimated value; and detecting the variation in the performance of said internal pumps.

6 Claims, 7 Drawing Sheets

METHOD AND DEVICE FOR MONITORING PERFORMANCE OF INTERNAL PUMP

FIELD OF THE INVENTION

The present invention relates to a method and device for monitoring the performance of internal pumps of a nuclear power plant that utilizes the internal pumps to circulate coolant.

Heretofore, in the field related to a nuclear reactor and the like that creates vapor so as to generate power, a reactor utilizing a jet pump to circulate coolant flow within the reactor and a reactor utilizing an internal pump to do the same are known.

In a jet pump plant, a number of (normally around 20) jet pumps are placed inside the reactor pressure vessel, which are used to send the coolant toward the core so as to cool the core. In this type of nuclear reactor where jet pumps are used to flow the coolant, the flow resistance at each of the various areas of the jet pumps, such as the drive nozzle portion, the suction portion and the throat diffuser, are different according to each jet pump, and further, the portions of the jet pumps can be slightly deformed as time passes. Considering these conditions, the flow resistance of the jet pumps, and therefore the performance of the jet pumps, can vary as time passes.

Japanese Patent Laid-Open Publication No. 6-160582 discloses a method for detecting the performance deterioration of each jet pump by estimating the flow resistance coefficient of each portion of the jet pumps based on the measured flow quantity of the jet pumps, and by monitoring the estimated resistance coefficient. In a jet pump plant, since each diffuser of each jet pump constitutes a flow path, it is possible to monitor the differential pressure and the flow rate variation of each pump by performing an evaluation based on the differential pressure signal equipped to each diffuser.

On the other hand, in an internal pump plant, a large number of (normally around 10) internal pumps are used to send the coolant toward the core, instead of the jet pumps.

FIG. 2 shows an example of a nuclear reactor of an internal pump plant. The internal pumps 111 are mounted in the downcomer portion 113 of a reactor pressure vessel 112, so as to raise the pressure of and send out the coolant flow 114 from the downcomer toward the lower plenum 115. A number of (normally around 10) internal pumps are provided. The flow path of the intake side of the internal pump is shared by all the internal pumps at the downcomer portion, and there are no individual flow paths for each pump as is the case with the jet pump. Therefore, in an internal pump plant, the differential pressure of the pump portion used to compute the pump flow quantity is measured by a differential pressure meter mounted to the upstream side separated from the suction portion of the pumps, so as to enable the use of a common value for each operating pump and so as not to be influenced by the flow near the suction portion of the pump. The pump flow is computed based on a correlation equation measured in advance through a test performed outside the plant, and based on the differential pressure of the pump portion measured as above, the pump speed, and the reactor water temperature.

Since no jet pump is equipped in the internal pump plant, it is impossible to monitor the pump performance by the method disclosed in the above-mentioned publication. In other words, in a jet pump plant, it is possible to mount a differential pressure system to the diffuser of each individual jet pump, and by performing a test for each individual jet pump outside the plant, the relation between the generated differential pressure and the flow rate can be computed in advance for each jet pump, based on which the plant can be monitored during operation.

However, the structure of the internal pump system makes it difficult to mount differential pressure gages to individual pumps, and the measured differential pressure of the pump portion is utilized as a common value for all the pumps. Therefore, if for example the pump performance of one out of ten pumps equipped in the system changes, it is difficult to detect this change in performance as a variation in the differential pressure value or a variation in the pump flow.

SUMMARY OF THE INVENTION

The object of the present invention is to provide a method and device for monitoring the performance of internal pumps in an internal pump plant, enabling the variation of the pump performance to be detected at an early stage and also enabling the pump having the varied performance to be specified.

The present invention relates to a method for monitoring the performance of internal pumps of a plant in which the coolant is driven through plural internal pumps, the method comprising measuring the power input to the pump motor that drives the internal pumps, estimating the input power to the pump motor based on the test performed outside the plant corresponding to the pump speed and the flow of the pump measured at the plant, computing the ratio of the actual measured value of the power input to the pump motor to the estimated value, and detecting the performance variation of the internal pump.

According to one example, the ratio of input power to the pump motor for each of the plural number of internal pumps is computed, and when the ratio of input power to the pump motor drops below a threshold set in advance, the pump performance is determined as varied, and the internal pump is specified.

Moreover, the present invention provides a device for monitoring the performance of internal pumps of a plant in which the coolant is driven through plural internal pumps, the device comprising a pump-performance-ratio computing unit for taking in the differential pressure of the pump portion, the pump speed, the pump motor power input of the motor driving the pump, and the pump flow measured at the actual pump, and computing the ratio between the motor power input of the actual pump and the pump motor power input based on the result of the test performed in advance outside the plant, and a pump-performance-ratio display device for displaying the computed input power ratio of the pump motor.

DETAILED DESCRIPTION OF PREFERRED EMBODIMENTS

The preferred embodiments of the present invention will now be explained with reference to the drawings.

Figure 1:
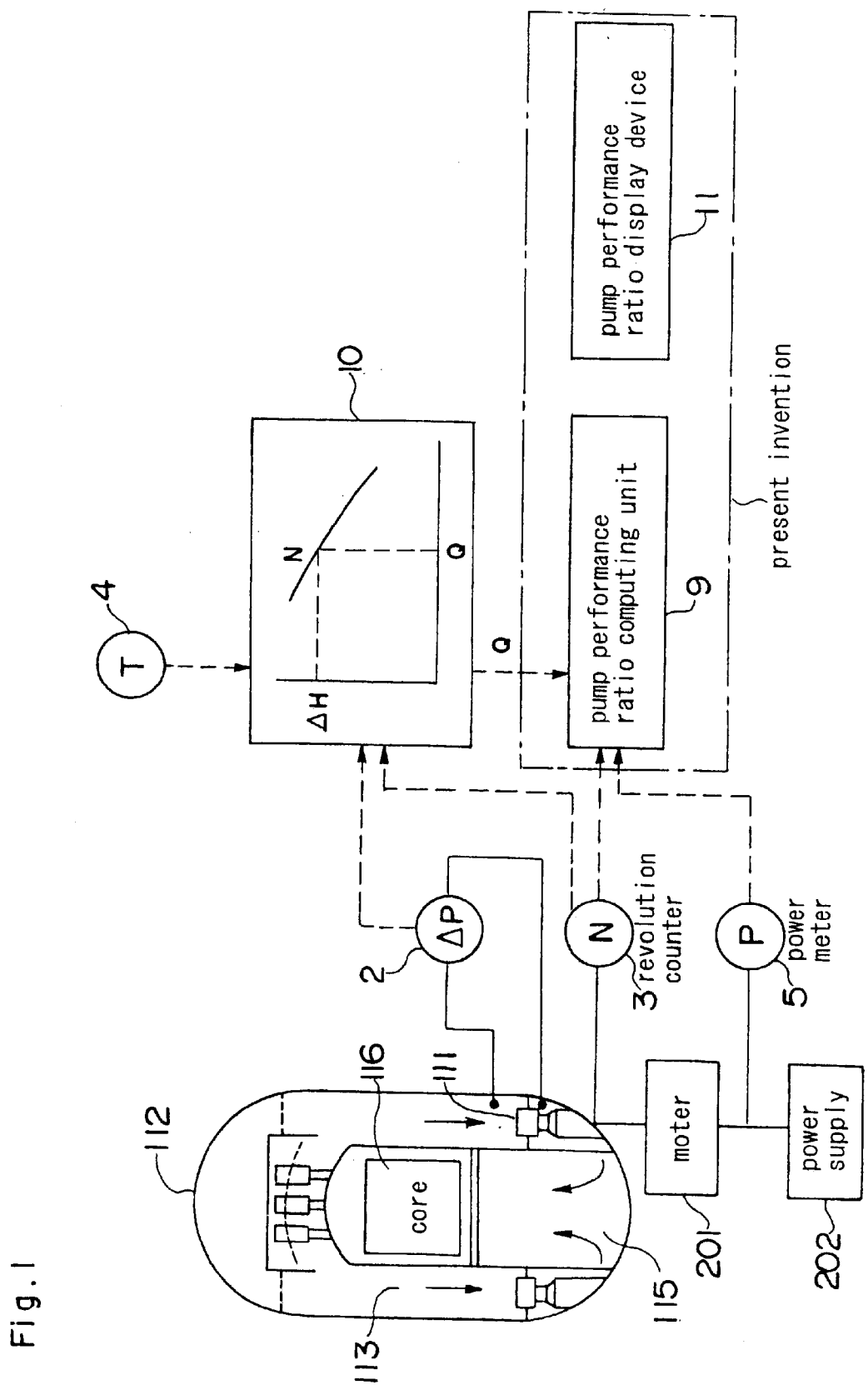
FIG. 1 shows the structure of the device for monitoring the performance of internal pumps according to one embodiment of the present invention.
Figure 2:
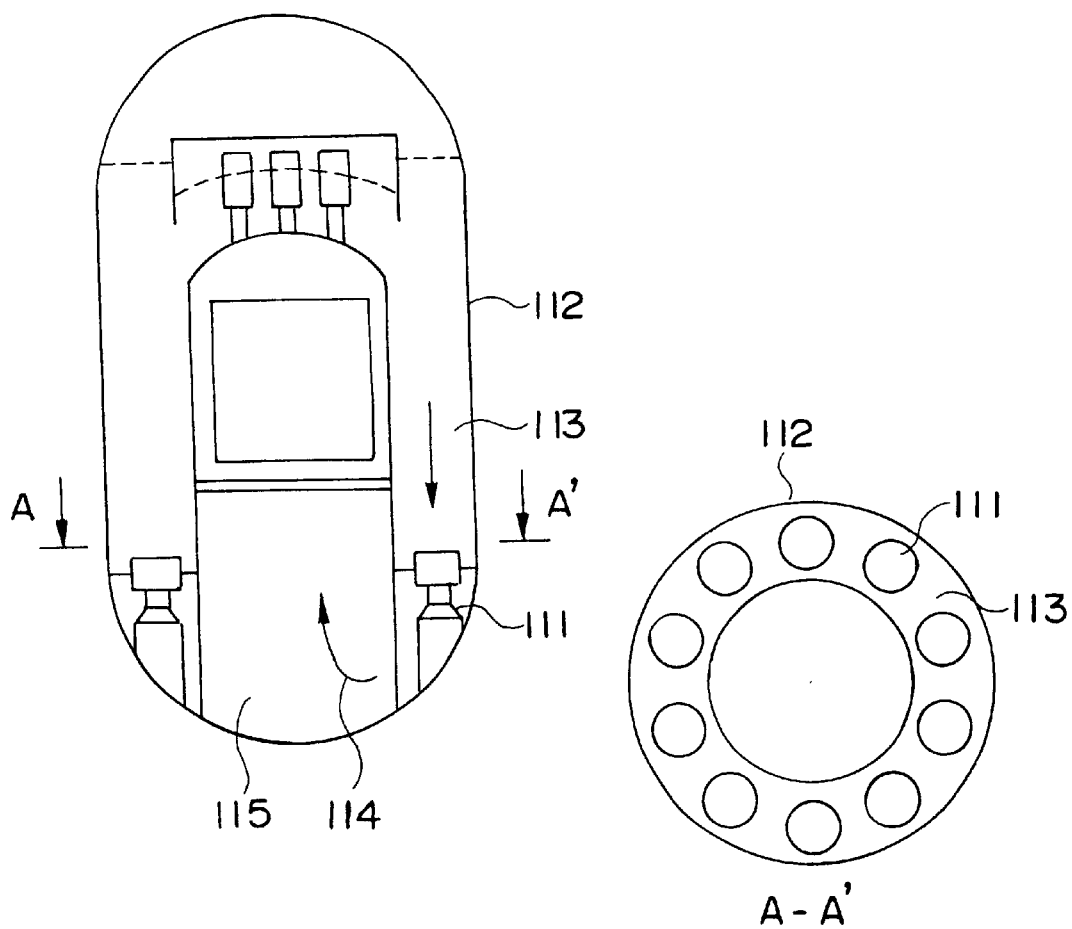
FIG. 2 shows an example of the nuclear reactor in an internal pump plant.

FIG. 1 shows the structure of the device for monitoring the performance of the internal pumps according to one embodiment of the present invention. The pump performance monitoring device according to the invention comprises a pump performance ratio computing unit 9 and a pump performance ratio display device 11.

Each internal pump 111 is driven by a motor 201 connected to the pump, and power is supplied to the motor 201 from a power supply 202. The motor 201 is equipped to each pump. The pressure of the coolant flow is raised by the pump 111 so that the coolant travels from a downcomer 113 toward a core 116 through a lower plenum portion 115. The differential pressure generated at the pump portion (the pressure difference between the downcomer area and the lower plenum area) is measured through differential pressure gages 2 that are positioned in the circumferential direction of the pump portion. Further, each pump is equipped with a pump speed counter 3. Moreover, each pump is equipped with a power meter 5 that is positioned either at the input portion of the pump motor 201 or at the output portion of the power supply 202 for detecting the power input to the motor.

The pump flow Q is computed by a pump flow calculation unit 10 in FIG. 1 based on the correlation equation of the flow and the differential pressure (equation Q–ΔH) utilizing the measured differential pressure ΔP, the pump speed N for each pump, and the fluid temperature T. The correlation is measured in advance for each pump respectively at a test facility outside of the plant (external test). The value of ΔP and T are common to all pumps.

In the external test, the pump flow Q, the differential pressure ΔP of the pump portion, the fluid temperature T, and the pump speed N are measured for each of the pumps respectively that are to be equipped to the actual plant, using a loop test facility. Each pump is mounted in the loop test facility at a time. Then, based on ΔH obtained by performing density conversion of differential pressure ΔP by temperature T, and the relation between Q and N, the relational equation ΔH=f(Q, N) showing the relation between the pump flow Q and ΔH at the actual plant is created, which is set to the pump flow computing unit 10 in FIG. 1. This is the Q–ΔH equation mentioned above, and in the actual plant, the flow Q computed based on relation f utilizing ΔH and N is set as the flow of the actual plant.

The differential pressure, the pump speed N, the motor input power P and the pump flow Q measured in the actual plant is input to a pump performance ratio computing unit 9 in FIG. 1. In the pump performance ratio computing unit 9, the ratio R between the motor power input of the actual pump and the pump motor power input of the external test obtained from the result of the test performed outside the plant is computed, as is explained later. The result is transmitted periodically to a pump performance ratio display device 11, and the display device 11 displays the successive variation of R during plant operation. When variation exceeding the threshold set in advance occurs, the display on the screen and the like is used to notify the operator that there is a possibility that the pump performance has varied.

Figure 3:
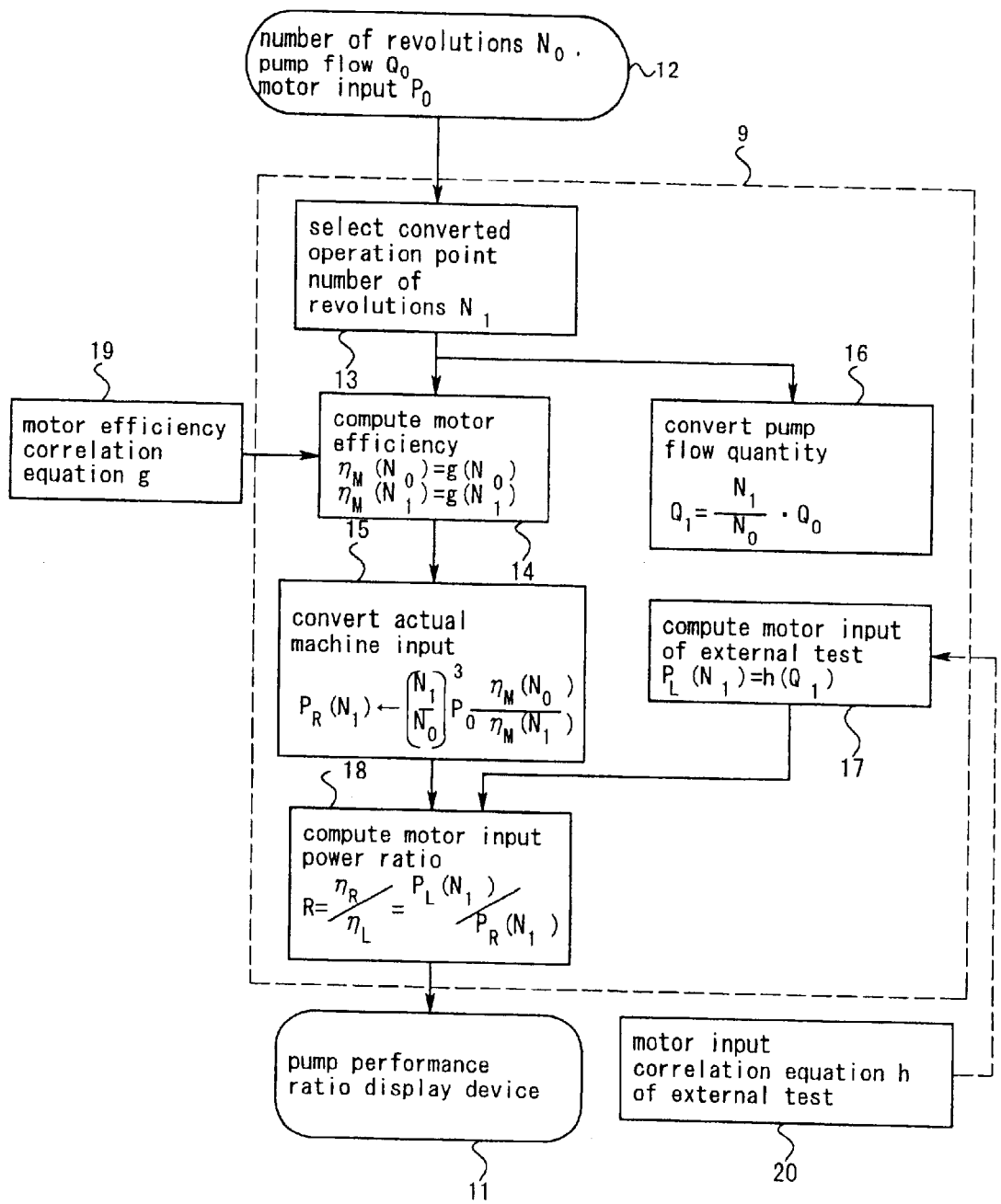
FIG. 3 is an operation flow of the motor input power ratio (performance ratio) according to the present invention.

FIG. 3 shows the operation flow of the motor input power ratio (performance ratio) R by the pump performance ratio computing unit 9 in FIG. 1. First, the principles enabling the pump performance to be monitored by evaluating the motor input power ratio R is explained.

The pump overall efficiency is obtained from the following equation.

[Equation 1]

$$\eta = \frac{\gamma g Q H}{P} \quad (1)$$

In the equation, η: overall efficiency, γ: density of coolant flow, g: constant (gravity acceleration), Q: pump flow, H: total head, and P: power input to the pump motor.

Further, the total head H is represented by:
[Equation 2]

$$H = \Delta H + K Q^2 \quad (2)$$

In the equation, ΔH: pump portion differential pressure (value obtained by performing density conversion to the measured differential pressure (ΔP) 2 of FIG. 1 by temperature (T) 4), K: pressure loss coefficient of the pump diffuser portion, and Q: pump flow computed by the pump flow computing unit 10 of FIG. 1. Reference K represents the pressure loss coefficient of the pump diffuser portion that has been measured and evaluated in advance.

Figure 4:
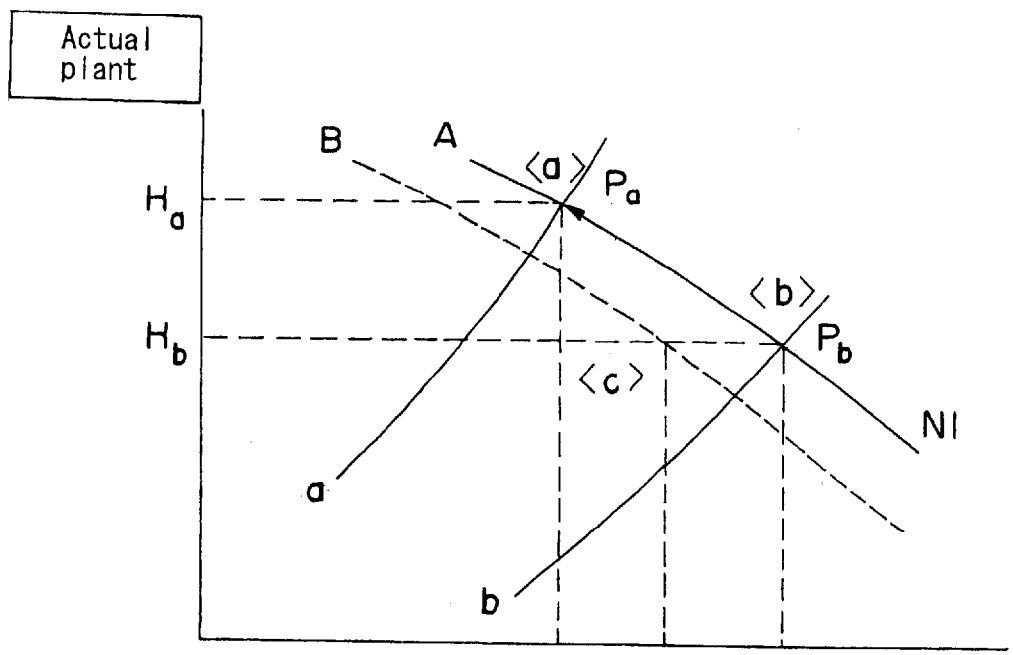
FIG. 4 is a characteristic chart of the flow quantity/differential pressure of the pump (actual plant)
Figure 5:
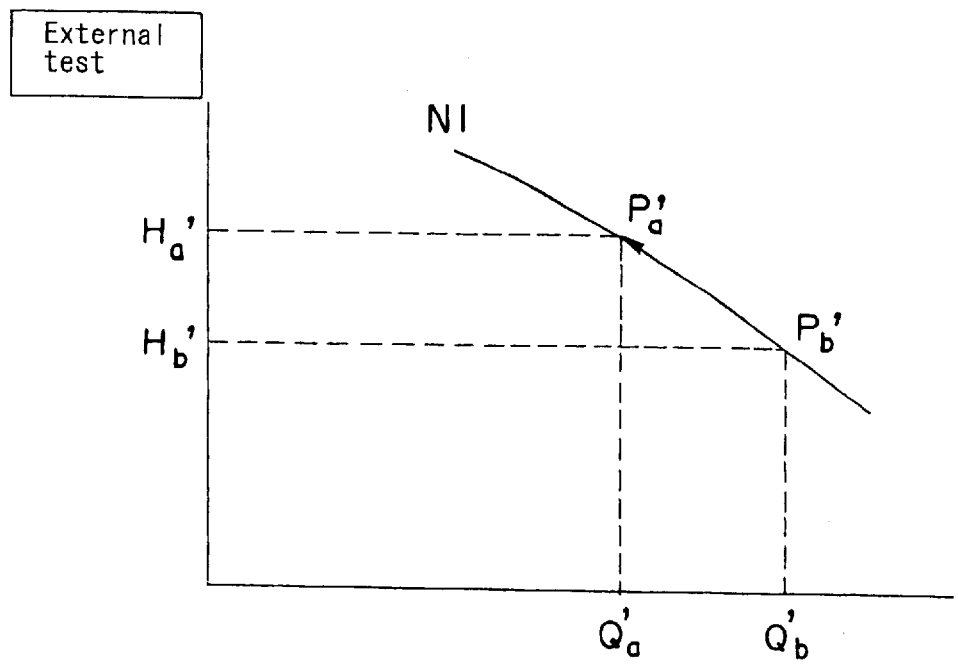
FIG. 5 is a characteristic chart of the flow quantity/differential pressure of the pump (external test)

At this time, if the operation point of the pump is to be plotted onto a flow/differential pressure diagram, it will be like point a shown in FIG. 4. The curved line A of the drawing shows the pump characteristic when the pump speed is N1. If the operating conditions of the pump is varied while the pump speed N1 is fixed, (G, H) will move along the curved line A. If for example the control rod pattern of the core is changed, by which the core power shape is changed from the bottom peak to upper peak and the core pressure drop is reduced, the pressure-drop characteristic of the recirculation system changes from <a> to <b>. As this occurs, the operation point of the pump moves from point <a> to point <b>.

On the other hand, suppose that the pump performance changes into curved line B of FIG. 4. In this case, the real operation point corresponding to the measured differential pressure $H_B$ is <c>. However, since the pump flow is computed based on the curve A showing the correlation equation that is set in advance, the pump flow recognized by the operator will be an apparent flow $Q_B$ that is greater than the actual flow $Q_c$. The curve B is considered to vary according to the degree of variation of the pump performance, and it is difficult to set curve B in advance.

As explained, in the internal pump plant, even when monitoring is performed based on the differential pressure of the pump portion, it is impossible to distinguish whether the change of the core power shape has caused the pump operation point to vary or whether variation of pump performance has occurred.

Therefore, the present invention takes into consideration the motor input of the pump, and monitors the plant based on the variation in input power ratio of the pump motor.

In FIG. 4, the present pump operation point is set as <a>. Further, the pump operation point monitored on another operating day is set as <b>. The pump speed N2 of the pump observed on another day generally differs from the pump speed N0 of point <a>, but point <b> is converted so as to have the same speed condition as point <a>. In other words,

[Equation 3]

$$Q_b = \left(\frac{N0}{N2}\right)Q_2, \quad H_b = \left(\frac{N0}{N2}\right)^2 H_2 \tag{3}$$

Moreover, the input to the pump motor after the conversion is represented by Pb. The overall efficiency $\eta_a$, $\eta_b$ of the pump at point <a> and point <b> can be represented by the following equations, respectively.

[Equation 4]

$$\eta_a = \frac{\gamma g Q_a H_a}{P_a} \tag{4}$$

[Equation 5]

$$\eta_b = \frac{\gamma g Q_b H_b}{P_b} \tag{5}$$

On the other hand, the overall efficiency $\eta'_a$, $\eta'_b$ of the pump during the external test performed outside the plant can be expressed by the following equations.

[Equation 6]

$$\eta'_a = \frac{\gamma' g Q'_a H'_a}{P'_a} \tag{6}$$

[Equation 7]

$$\eta'_b = \frac{\gamma' g Q'_b H'_b}{P'_b} \tag{7}$$

The overall efficiency ratio $\eta_a/\eta'_a$ of the pump of the actual plant to the external test is:

[Equation 8]

$$\frac{\eta_a}{\eta'_a} = \left(\frac{Q_a}{Q'_a}\right)\left(\frac{H_a}{H'_a}\right)\left(\frac{P'_a}{P_a}\right) \tag{8}$$

Wherein $\gamma=\gamma'$.

In the external test, the pumps are mounted one at a time to a loop testing facility, where $Q'_a$, $\Delta H'_a$, $P'_a$ and $N'$ are measured for each individual pump. Especially, $Q'_a$ is directly measured using a flowmeter equipped to the testing facility. On the other hand, $\Delta H_a$, $P_a$ and N of the actual plant data are all based on direct measurement, but $Q_a$ is not a directly measured value, but a result of the calculation based on the correlation of Q and H (or Q and $\Delta H$) created for each pump from the external test result and based on the measured value $\Delta H$.

If the pump performance of the actual plant is the same as the pump performance obtained by the external test, $P'_a$ should be equal to $P_a$ when $Q'_a=Q_a$ and $H'_a=H_a$, so the efficiency ratio is 1. Accordingly, by observing the overall efficiency of the pump of the actual plant and the external test, the motor input power ratio R is constant even when the variation of the core pressure drop and the like causes the operation point of the pump to vary, and it is clear that the pump performance has not changed.

On the other hand, in case the pump performance varies during operation of the actual plant, the pump flow observed based on the measured differential pressure $H_b$ corresponding to the real flow $Q_c$ of the actual plant becomes $Q_b$.

The apparent efficiency $\eta_R$ of the actual plant becomes:

[Equation 9]

$$\eta_R = \frac{\gamma g Q_b H_b}{P_c} \tag{9}$$

On the other hand, when considering that the apparent flow and the differential pressure $Q_b$ and $H_b$ of the actual plant are correct, the efficiency $\eta_L$ of the external test is expressed by the following equation, utilizing the motor input $P'_b$ corresponding thereto.

[Equation 10]

$$\eta_L = \frac{\gamma g Q'_b H'_b}{P'_b} = \frac{\gamma g Q_b H_b}{P_b} \tag{10}$$

Therefore, the overall efficiency ratio $\eta_R/\eta_L$ of the actual plant and the external test becomes:

[Equation 11]

$$R = \frac{\eta_R}{\eta_L} = \frac{P'_b}{P_c} = \frac{P_b}{P_c} \tag{11}$$

The efficiency ratio is expressed by the pump motor input power ratio R, and the input power ratio R will not be equal to 1.

As explained, the present inventors have discovered that by monitoring the ratio R of the pump motor input evaluated from the data measured in the actual plant to the pump motor input at the operation point of the external test corresponding to the operation point of the pump being measured in the actual plant, it becomes possible to detect the variation of the pump performance in an internal pump plant.

The actual steps for monitoring the pump performance based on the above-mentioned principle will now be explained with reference to FIG. 3.

Figure 8:
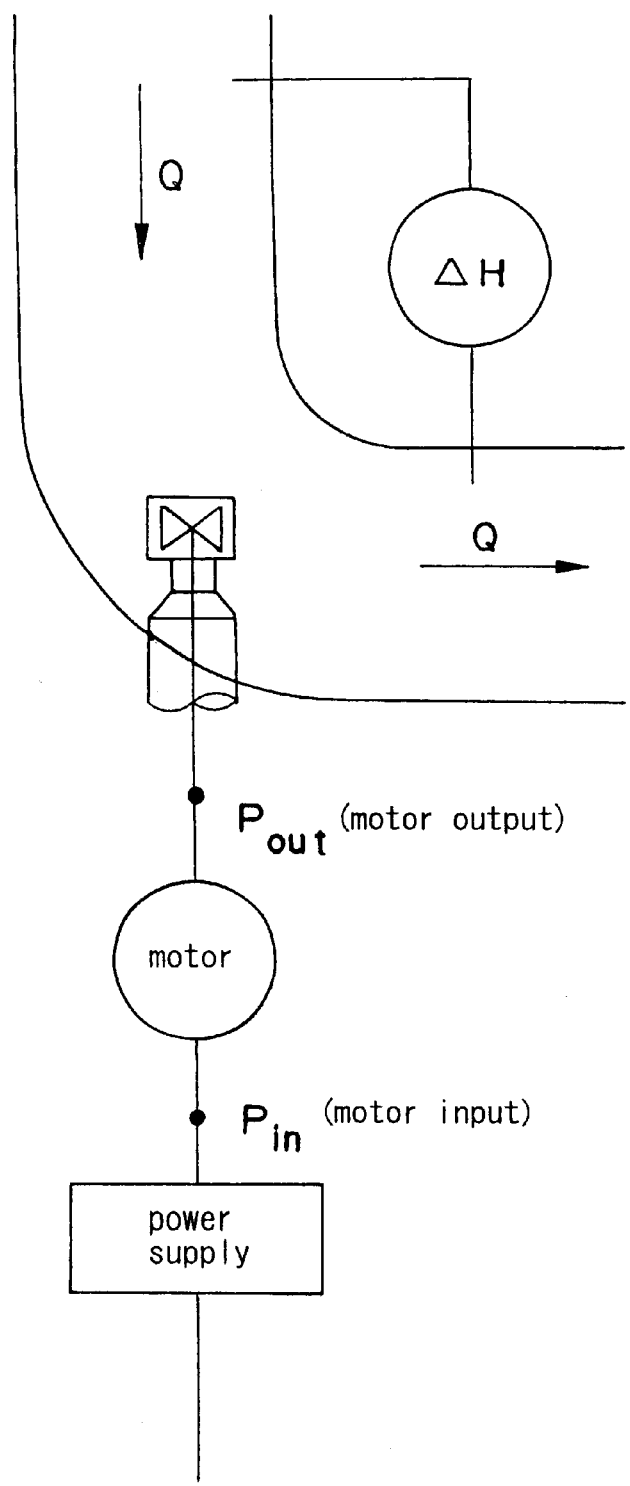
FIG. 8 is an explanatory view of the motor input and motor output.

The block 9 portion of FIG. 3 corresponds to the pump performance ratio computing unit 9 of FIG. 1. In the computing unit 9, the external test result necessary for computation is set as motor efficiency correlation equation (g) 19 and motor input correlation equation (h) 20. The motor efficiency is defined by the following equation using the symbols of FIG. 8.

[Equation 12]

$$\eta_M = \frac{P_{out}}{P_{in}} \tag{12}$$

As mentioned above, the external test enables measurement of the pump flow Q, the pump differential pressure $\Delta P$, the fluid temperature T, the pump speed N, the motor input, and the motor output of each individual pump by mounting one pump at a time to a loop testing facility and the like. Based therefore on the external test data, the evaluation on the motor input, the motor efficiency, and the relation between Q and $\Delta H$ can be obtained for all the individual pumps equipped to the actual plant.

Figure 6:
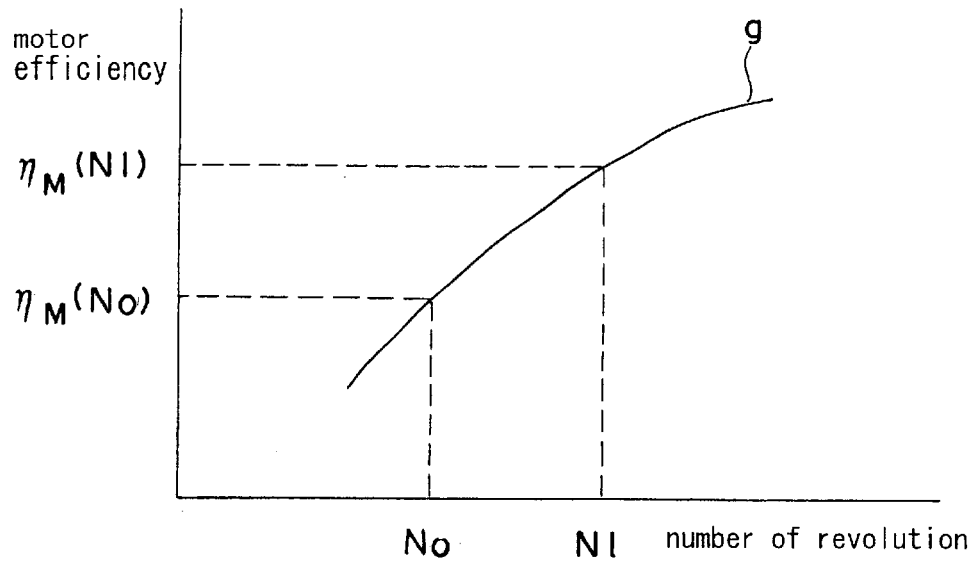
FIG. 6 is a characteristic chart showing the motor efficiency/pump speed according to the external test.
Figure 7:
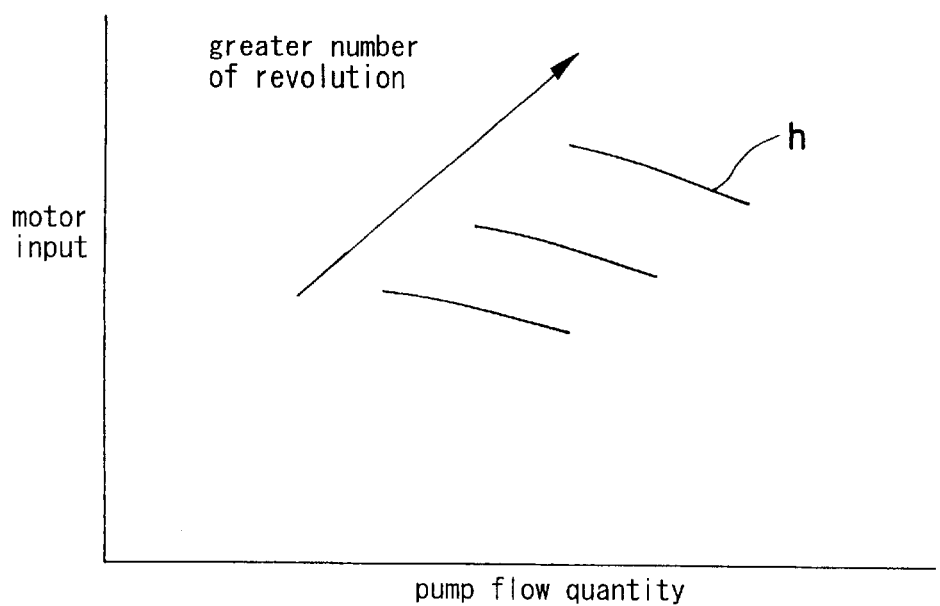
FIG. 7 is a measurement chart showing the relation between the motor input and the pump flow according to the external test.

The motor efficiency is prepared as correlation equation g (N) in the external test corresponding to the pump speed, as shown in FIG. 6. The motor efficiency correlation equation g (N) is set to the pump performance ratio computing unit 9 of FIG. 1. As mentioned later, the motor efficiency is used when converting the operation point of the actual plant at the pump performance ratio computing unit 9 (step 14 of FIG. 3). Further, as shown in FIG. 7, the relation between the motor input and the pump flow is measured for a typical pump speed during the external test, and correlation equation his prepared for each of the speeds.

At first in step 13, the pump performance ratio computing unit 9 selects the pump speed in the external test that is close to the speed of the actual plant as the converted operation point (pump speed N1) in order to convert the pump overall efficiencies of the external test and the actual plant into the same operating conditions. Then, in steps 16 and 17, the motor input during the external test is computed corresponding to the conditions of the actual plant operation.

At first, the flow of the pump of the actual plant is performed of the pump speed conversion. The converted flow $Q_1$ is obtained by multiplying the ratio of pump speed $N_0$ to $N_1$ by $Q_1$. In step 17, the motor input $P_L$ (N1) of the pump corresponding to the converted flow $Q_1$ is obtained using correlation equation h. Here, the flow $Q_1$ being used is obtained by converting the actual pump flow $Q_0$, and $P_L(N1)$ is the motor input that is computed considering value $Q_0$ as the true flow.

On the other hand, in steps 14 and 15, the motor input of the actual plant is converted into the number of the pump speed N1. Generally, the pump input is proportional to the cube of the pump speed, so by using the symbols of FIG. 8, it can be computed through the following equation:

[Equation 13]

$$P_{out}(N1) = \left(\frac{N1}{N0}\right)^3 P_{out}(N0) \tag{13}$$

However, since the value directly measured at the actual plant is the motor input $P_{in}$, the computed value should be corrected. This is expressed as follows based on equation 12:
[Equation 14]

$$P_{out}(N0) = \eta_M(N0)P_{in}(N0)$$
$$P_{out}(N1) = \eta_M(N1)P_{in}(N1) \tag{14}$$

Based on equations 13 and 14, the motor input converted into the number of pump speed $N_1$ is computed through equation 15.

[Equation 15]

$$P_{in}(N1) = \left(\frac{N1}{N0}\right)^3 \left(\frac{\eta_M(N0)}{\eta_M(N1)}\right) P_{in}(N0) \tag{15}$$

[Equation 16]

$$P_{in}(N1) = \left(\frac{N1}{N0}\right)^3 P_{in}(N0) \tag{16}$$

can be considered in order to correct the pump speed, but according to the present inventors, unless the evaluation based on equation 15 is performed, it is difficult to obtain the motor input power ratio R having an appropriate accuracy at a later step.

In step 14, the motor efficiency necessary for computing equation 15 is obtained using the motor efficiency correlation equation g set in advance. Thereafter, in step 15, the motor input $P_R(N1)$ at the converted operation point can be obtained through equation 15.

The ratio of motor input $P_R$ of the actual plant to the motor input $P_L$ of the external test under the converted operating conditions computed as above is obtained in step 18, which is set as motor input power ratio R. The computed result R is either obtained for individual pumps or as an average value for all the pumps, before being transmitted to the pump performance ratio display device 11 to be displayed on screen periodically.

In a plant where power supply 202 for driving the motors of the plural internal pumps is shared by the plural internal pumps and only the output power from the power supply 202 can be measured, the motor input power ratio R can be computed by utilizing an average output power computed by dividing the output power of the power supply 202 by the number of internal pumps that share the power supply 202, instead of using the motor input power of the actual plant.

If the pump performance has not changed, the motor input power ratio R should theoretically be 1. However, in the actual data, the value may be influenced by the difference of the measurement device between the actual plant and the external testing facility or by the fitting error of the correlation function g, h. It is more convenient to remove this influence when monitoring the pumps, so the R value computed either at the rated operation point (rated output, rated flow operation) during initial testing of the plant or during the initial period of the operation cycle (when the output reaches a rated output after startup) is set as reference value R0, and during the following operation period, the relative value of value R (=R/R0) should be monitored so that the performance condition of each pump can be observed easily.

Moreover, even if the pump performance does not vary during plant operation, value R fluctuates within a certain range due to the fluctuation of the actual plant data and the like. Therefore, in order to determine whether the change in the displayed value is caused by the change in the pump performance or is caused by the steady fluctuation of the actual measured data, a threshold value α is set in advance, and when value R changes and exceeds the threshold α, the display outputs a notice warning the operator that the pump performance has varied. If value R drops below the minimum value ($\alpha_{MIN}$) of the threshold α, it means that the actual pump performance of the plant is deteriorated.

In other words, it means that the actual pump flow is smaller than the pump flow computed by the pump flow computing unit 10 of FIG. 1 based on the measured pump portion differential pressure ΔP, so this specific pump should be examined with special care at the next scheduled checkup. Further, during the period where value R drops greatly below $\alpha_{MIN}$, instead of utilizing the total amount of pump flow, the core flow value during operation can be computed by the core flow evaluated based on the differential pressure at the core or from the core flow signal evaluated based on the heat balance method.

Figure 9:
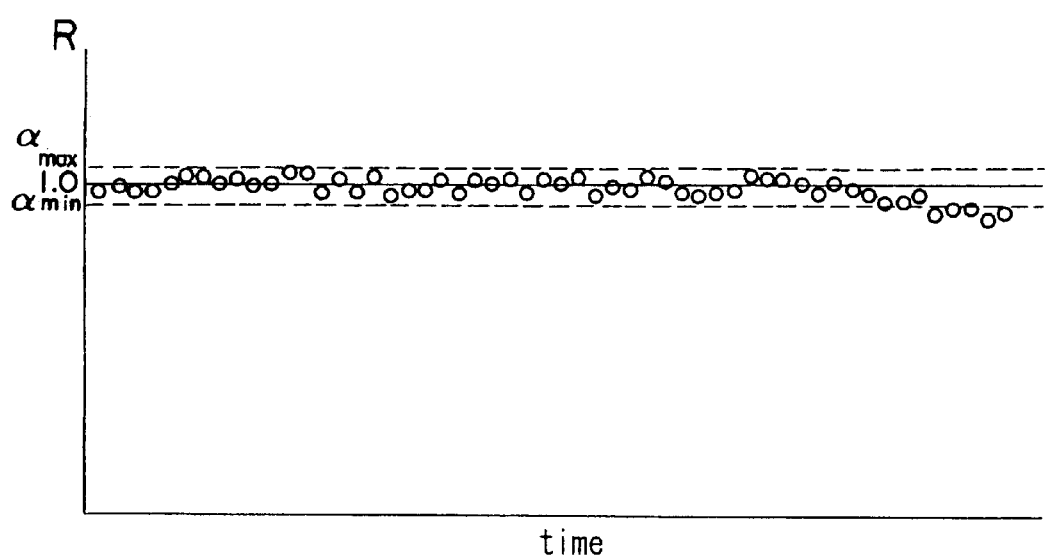
FIG. 9 is a chart showing the example of a display screen of the pump performance ratio display device according to the present invention.

Taking the accuracy of the differential pressure gage and the power gage into consideration, the level of threshold a should be set so that if value R varies over ±1.5%, for example, the variation is judged as indicating actual change in performance FIG. 9 shows an example of the displayed screen of the pump performance ratio display 11. The monitor screen displays the successive variation of value R. The value R displayed on the screen here is the relative value corresponding to reference value R0 as explained above. The threshold α is set so that the minimum value ($\alpha_{MIN}$) is 0.985 and the maximum value ($\alpha_{MAX}$) is 1.015, and the threshold level is indicated on the screen. The computed result of value R is periodically plotted onto the screen, enabling the operator to monitor the trend variation easily.

We claim:

1. A method for monitoring the performance of internal pumps in a nuclear power plant in which a coolant is driven through plural internal pumps placed inside the reactor vessel, the method comprising the steps of:

measuring a pump motor power input to each motor driving said pumps;

estimating the power input to said pump motor during a test performed outside said plant corresponding to the speed of each pump and the pump flow measured in the reactor pressure vessel;

computing a pump motor input power ratio based on said measured value and said estimated value; and detecting the variation in the performance of said internal pumps.

2. A method for monitoring the performance of internal pumps according to claim 1, wherein said pump motor input power ratio is computed for each of said plural internal pumps, respectively, and when any one of said pump motor input power ratio decreases and drops below a threshold value set in advance, the pump performance of said one internal pump is determined as varied and said pump is specified.

3. A method for monitoring the performance of internal pumps in a nuclear power plant in which a coolant is driven through plural internal pumps placed inside the reactor vessel, the method comprising the steps of:

measuring a pump motor power input to each motor driving said pumps;

estimating the power input to said pump motor during a test performed outside said plant corresponding to the speed of each pump and the pump flow measured in the reactor pressure vessel;

computing a pump motor input power ratio based on said measured value and said estimated value; and detecting the variation in the performance of said internal pumps; wherein the pump flow used in estimating said power input to the pump motor utilizes a computed flow value computed based on the relation equation of the pump flow, the speed and the pump differential pressure prepared in advance based on the pump speed, the differential pressure of the pump portion, the pump flow and the fluid temperature measured respectively for each individual pump during said test performed outside the plant, and utilizing the pump speed, the differential pressure of the pump portion, and the measured fluid temperature being measured.

4. A method for monitoring the performance of internal pumps in a nuclear power plant in which a coolant is driven through plural internal pumps placed inside the reactor vessel, the method comprising the steps of:

measuring a pump motor power input to each motor driving said pumps;

estimating the power input to said pump motor during a test performed outside said plant corresponding to the speed of each pump and the pump flow measured in the reactor pressure vessel;

computing a pump motor input power ratio based on said measured value and said estimated value; and detecting the variation in the performance of said internal pumps; wherein if a power supply for driving the motors of plural internal pumps are shared by said plural internal pumps, instead of measuring the pump motor power input of the motor driving said pumps, said method utilizes as the pump motor power input an average output power computed by dividing said power output of said power supply by the number of internal pumps sharing said power supply.

5. A device for monitoring the performance of internal pumps in a nuclear power plant in which a coolant is driven through plural internal pumps placed inside a reactor pressure vessel, said device comprising a pump performance ratio computing unit for taking in the differential pressure of the pump portion, each pump speed, the pump motor power input of each motor driving said pump, and the pump flow which are measured for each of the actual pumps in the reactor pressure vessel, and computing the ratio of said pump motor power input of said actual pump to the pump motor power input based on the result of a test performed in advance outside said plant; and a pump performance ratio display device for said computed input power ratio of the pump motor.

6. A device for monitoring the performance of internal pumps in a nuclear power plant in which a coolant is driven through plural internal pumps placed inside a reactor pressure vessel, said device comprising a pump performance ratio computing unit for taking in the differential pressure of the pump portion, each pump speed, the pump motor power input of each motor driving said pump, and the pump flow which are measured for each of the actual pumps in the reactor pressure vessel, and computing the ratio of said pump motor power input of said actual pump to the pump motor power input based on the result of a test performed in advance outside said plant; and a pump performance ratio display device for said computed input power ratio of the pump motor; wherein said pump performance ratio computing unit includes a means for selecting as a converted operation point the pump speed of the test performed outside said plant that is close to the pump speed of the actual plant; a means for computing a converted flow quantity by converting the pump flow of the actual plant into the pump speed; a means for computing based on a correlation equation the pump motor input power according to the test performed outside said plant corresponding to said converted flow; a means for computing the motor efficiency using a motor efficiency correlation equation set in advance; a means for computing the pump motor power input of the actual plant when said motor efficient is used for conversion into the pump speed at said converted operation point; and a means for computing the ratio of the pump motor power input during said test performed outside said plant to the pump motor power input of said actual plant.

* * * * *

UNITED STATES PATENT AND TRADEMARK OFFICE
CERTIFICATE OF CORRECTION

PATENT NO. : 6,619,111 B2
DATED : September 16, 2003
INVENTOR(S) : Hideo Soneda et al.

It is certified that error appears in the above-identified patent and that said Letters Patent is hereby corrected as shown below:

<u>Title page,</u>
Insert the following:
-- [30] Foreign Application Priority Data
Feb. 7, 2001 (JP) 2001-030796 --

Signed and Sealed this

Tenth Day of February, 2004

JON W. DUDAS
*Acting Director of the United States Patent and Trademark Office*